June 14, 1966 A. J. BARACKET 3,256,390
SYNCHRONIZING SIGNAL GENERATOR CONTROL CIRCUITS
Filed Sept. 5, 1962
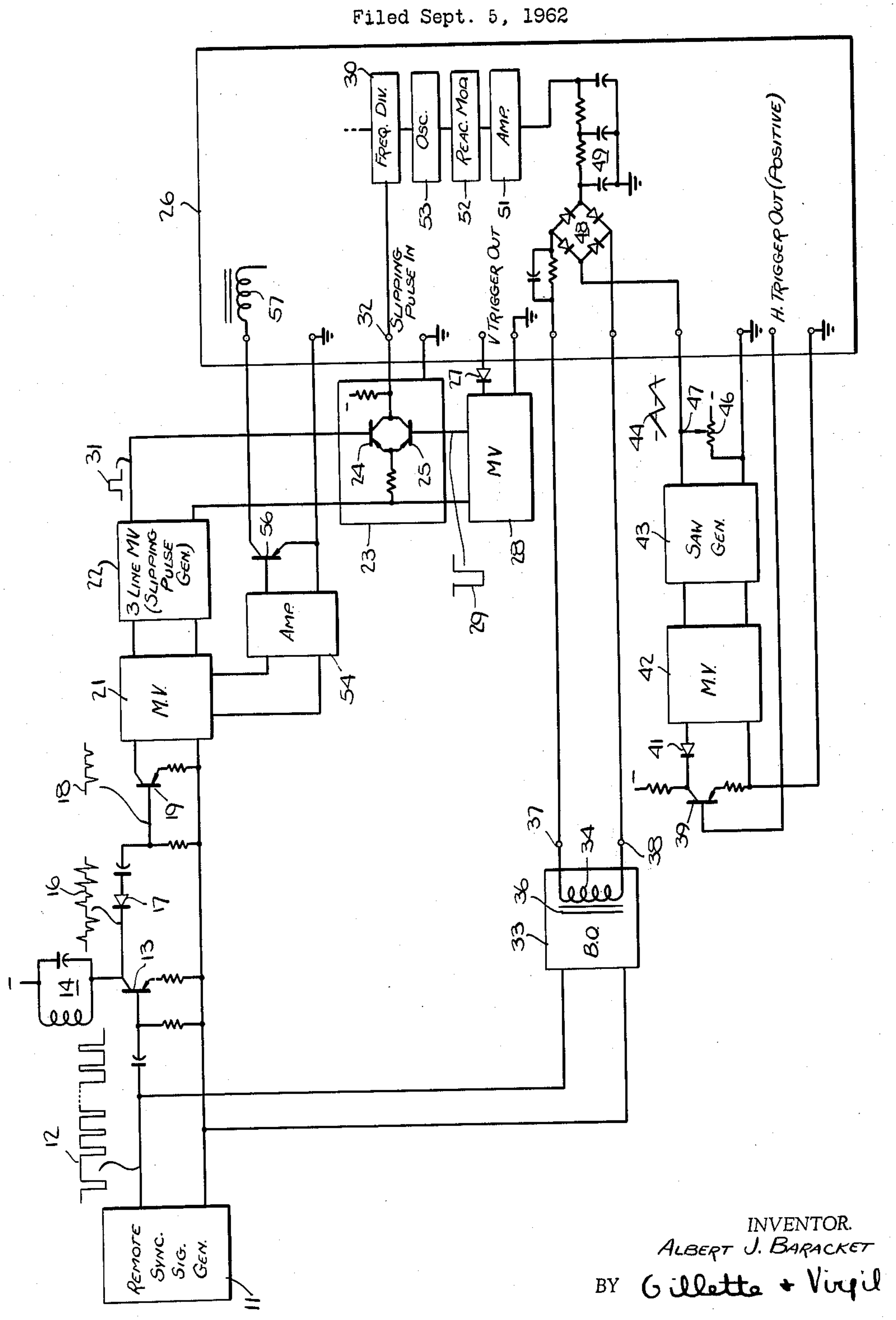
INVENTOR.
ALBERT J. BARACKET
BY Gillette + Virgil
ATTORNEYS United States Patent Office 3,256,390
Patented June 14, 1966

3,256,390

SYNCHRONIZING SIGNAL GENERATOR CONTROL CIRCUITS

Albert J. Baracket, Cedar Grove, N.J., assignor to Diamond Power Specialty Corporation, Lancaster, Ohio, a corporation of Ohio Filed Sept. 5, 1962, Ser. No. 221,463
4 Claims. (Cl. 178—69.5)

This invention relates to means for controlling the operation of one television synchronizing signal generator in accordance with signals produced in a second synchronizing signal generator, as may be desirable, for example, in the control of a centrally located synchronizing signal generator in accordance with signals produced in an outlying generator at a baseball stadium or other remote location.

It frequently happens in television programming that a program will originate in part from the central studio and in part from a remote location, and that the connecting lines between the two locations do not permit a single synchronizing signal generator to be used but require separate synchronizing signal generators at each place. Then it becomes necessary to control the operation of one of the generators (usually the one in the central studio) in accordance with the other generator. This requires exact synchronization of frame, or vertical, or low frequency, synchronizing signals as well as of the line, or horizontal, or high frequency, synchronizing signals.

In accordance with this invention a signal is derived from the composite synchronizing signal of one signal generator and is applied to counting circuits of a second generator to modify the operation thereof until such time as the two generators are operating in step, with respect to both horizontal synchronizing signals and vertical synchronizing signals.

The invention will be described in greater detail in the following specification together with the drawing in which the only figure is a schematic circuit drawing, partly in block form, of the control system of this invention.

In the drawing reference character 11 indicates a first synchronizing signal generator capable of producing signals of the type used in television systems and indicated by wave form 12. The generator 11 may be located at a remote spot and may in fact include not only the generator but a connecting wire or wireless link together with means to derive from the transmitted signal just the synchronizing portion thereof as indicated by wave form 12.

One output circuit of generator 11 is connected to the base input circuit of transistor 13. The collector circuit of transistor 13 includes a tuned circuit 14 which is tuned to a frequency having a half period duration approximately equal to the duration of an equalizing pulse in the synchronizing signal wave form 12. The wave form 12 is so polarized that the transistor 13 is rendered conductive each time a negative-going signal appears in the wave form 12. This energizes the tuned circuit 14 to begin an oscillation. If the transistor 13 is rendered operative by a regular horizontal synchronizing pulse or by one of the even longer serrated, or vertical synchronizing pulses, the tuned circuit 14 goes through a complete cycle while the transistor is conductive and thus the negative-going second half cycle is damped out by the conductive transistor with the result that the output signal at the collector of the transistor consists of only a positive-going impulse.

On the other hand an equalizing pulse has approximately one half the width (or the duration) of a synchronizing pulse and therefore the transistor is rendered conductive for only the first half cycle of oscillation of the tuned circuit 14. Then when the second half cycle comes along, the transistor 13 is no longer conductive and does not damp out this second half cycle.

A diode 17 is connected to the collector of the transistor 13 to receive the output signal 16 therefrom and is polarized so as to transmit only the negative-going signals. Therefore, it transmits only a series of negative-going pulses which occur each time the equalizing pulses of signal 12 are applied to the base of the transistor 13 during the vertical synchronizing interval. The pulses transmitted by the diode 17 are indicated by reference character 18 and are applied to a transistor 19 which serves as a triggering circuit for a multivibrator 21. The positive pulses also actuate a second multivibrator 22, which is called a slipping pulse generator and which generates a single pulse having a duration of approximately three horizontal lines, that is, about 3H, or $3/15{,}750$ of a second, where H is $1/15{,}750$ of a second and is the duration of a single line of a commercial television picture.

The three line pulse of multivibrator 22 is applied to a coincidence gate 23 which includes two transistors 24 and 25. Transistor 25 receives its energizing signal from a synchronizing signal generator 26, which is the generator to be controlled in response to the signal from generator 11. The signal which is eventually to be applied to the transistor 25 is derived from the vertical trigger signal generator within the synchronizing generator 26 and is connected by a diode 27 to a multivibrator 28. Since the multivibrator 28 is actuated by the vertical trigger signal, it generates a pulse once each frame and at a time determined by the particular phasing of the synchronizing signal generator 26. The output signal of the multivibrator 28 is a negative-going pulse indicated by reference character 29 and is applied to the base of the transistor 25. The output pulse of the three line multivibrator 22 is indicated by reference character 31 and is applied to the base of the transistor 24. The conditions of conductivity of the transistors 24 and 25 are so selected that if the pulses 29 and 31 occur simultaneously, the increase of conductivity of one of the transistors is balanced by the decrease of conductivity of the other transistor so that the output signal derived from the common collectors of the two transistors at the output terminal 32 does not change. However, if the timing of the pulses 29 and 31 is not simultaneous, these pulses are transmitted in sequence to the terminal 32 to form a slipping pulse, the purpose of which is to affect the operation of a binary counter frequency divider 30 in the synchronizing signal generator so as to modify the count and cause the generator 26 to skip counts, as described in my co-pending patent application entitled Frequency Dividing Circuit, filed September 5, 1962, now Patent No. 3,202,837, until such time as its phasing is exactly the same as that of the generator 11 at which time it will cease to skip counts because no more slipping pulses will have been generated.

It is also essential to control the synchronizing signal generator 26 so that its horizontal synchronizing pulses are generated simultaneously with the pulses of generator 11. This is done by means of pulses which are applied to a blocking oscillator 33 from the synchronizing signal generator 11. The blocking oscillator 33 is so timed that it oscillates once each time a horizontal synchronizing pulse is produced in the output signal 12 of the synchronizing signal generator 11. The output signal of the blocking oscillator is taken from a winding 34 on the blocking oscillator transformer 36 and is connected through a pair of output terminals 37 and 38 to the synchronizing signal generator 26.

At the same time a horizontal trigger signal is obtained from the synchronizing signal generator 26. This signal is in the form of a series of positive pulses occurring at the repetition rate of the horizontal synchronizing signal and is applied to a transistor 39, which in turn transmits the amplified pulses to a diode 41 which permits only the negative-going impulses to pass to a delay multivibrator 42. The output signal of the delay multivibrator is used to control the operation of a sawtooth wave generator 43 which generates a sawtooth wave 44 having the same repetition rate as the horizontal synchronizing impulses derived from the synchronizing signal generator 26. A direct current, or D.C., component is added to the sawtooth wave by means of a potentiometer 46. The arm of the potentiometer is connected to the output terminal of the sawtooth wave generator 43, and movement of the arm of the potentiometer changes the D.C. voltage level of the sawtooth wave 44.

The output signal from the blocking oscillator 33, which is in the form of positive and negative pulses and is obtained from terminals 37 and 38, respectively, and the sawtooth output signal from terminal 47 are both connected to the synchronizing signal generator 26. Within the synchronizing signal generator the pulses from the blocking oscillator are applied to a four-diode clamping circuit 48 to render the diodes conductive at each occurrence of pulses of the proper polarity from the blocking oscillator. Since these pulses are timed according to the horizontal synchronizing signal of the controlling synchronizing signal generator 11, the repetitive short periods of conductivity of the clamping circuit 48 will be correspondingly determined by the synchronizing signal generator 11. The output signal of the sawtooth wave generator 43 is also connected to the same clamping circuit, and each time the clamping circuit is rendered conductive, the instantaneous voltage level of terminal 47 is connected through to a filter 49 which is capable of smoothing out the relatively high frequencies present in waveforms having a basic repetition rate equal to that of the horizontal synchronizing signal. The direct current output signal of the filter 49 is connected through an amplifier 51 to a reactance modulator 52 which controls the operation of an oscillator 53. This is the oscillator that generates the basic signal to control the operation of synchronizing signal generator 26 and therefore control of this oscillator determines the exact timing of signals produced by the synchronizing signal generator in accordance with the techniques in my co-pending application, supra.

The relative timing of the sawtooth wave 44 and the pulses from the blocking oscillator 33 are such that these pulses are coincident with the retrace portion of the sawtooth wave. When the relative phasing between the controlling synchronizing signal generator 11 and the controlled synchronizing signal generator 26 is correct, the phasing of the blocking oscillator 33 causes its pulses to occur at approximately the mid-point of the retrace portion of the sawtooth wave 44, and the D.C. level at this portion is chosen to be proper to control the reactance modulator 52 and thus the oscillator 53. By causing blocking oscillator pulses to occur during the retrace portion of the sawtooth wave 44, a slight change in the relative timing of the sawtooth wave with respect to the pulses will produce a considerable change in the D.C. level and thus will have a considerable effect on the reactance modulator 52. If the blocking oscillator pulses were timed to occur during the less steeply sloping portion of the sawtooth wave 44, a greater difference of phasing would be required to produce the same change in level of the signal controlling the reactance modulator 52.

The output signal of the multivibrator 21 is applied to a relay amplifier 54 which is so arranged that it is not capable of responding to rapid changes in voltage level. The output signal of amplifier 54 controls the conductivity of a transistor 56 which is connected in series with a coil 57 of a relay in the synchronizing signal generator 26. As long as signals are being produced by the multivibrator 21, these signals create in the amplifier 54 a state of conductivity that remains relatively constant. This in turn causes the transistor 56 to become and to remain conductive as long as signals are being produced in the multivibrator 21, and this energizes the relay coil 57 to switch individual circuits within the synchronizing signal generator to be controlled by the signal generator 11. If the synchronizing signal generator 11 is turned off or is disconnected, no more pulses will be generated by the multivibrator 21, and very shortly thereafter the transistor 56 will become nonconductive and hence will not permit the relay 57 to continue in its energized state. This will return the circuits controlled by the relay to pre-determined positions permitting the synchronizing signal generator 26 to continue operating alone.

While the invention described hereinabove has been considered in terms of specific embodiments, it will be apparent to those skilled in the art that modifications may be made therein without departing from the true scope as defined by the following claims.

What is claimed is:

1. A control system for controlling the operation of a first television synchronizing signal generator to operate in substantially exact phase with the operation of a second television synchronizing signal generator, said system comprising: an amplifier having an output and a parallel tuned circuit connected thereto and tuned to a frequency substantially equal to $\frac{1}{2}t_e$ where $t_e$ is the duration of a television equalizing pulse, said amplifier being made conductive during each television synchronizing and equalizing pulse to initiate oscillations in said tuned circuit, and said amplifier remains conductive to damp out said oscillations, except oscillations due to equalizing pulses, thereby generating an electrical signal under the control of and substantially coincident with the equalizing pulse portion of the signal produced by said second generator; a binary frequency divider circuit in said first generator to produce a relative low frequency pulse signal from a relatively high frequency pulse signal by dividing the frequency of said high frequency signal by a predetermined amount; a coincidence circuit connected to said frequency divider circuit, and a connection from said amplifier whereby said coincidence circuit can compare the signal produced by said amplifier with a signal from said frequency divider circuit to generate a slipping signal when the compared signals do not substantially correspond in time with each other; and an output circuit for said coincidence circuit connected to said binary frequency divider to modify the ratio of division therein until the low frequency pulses produced thereby are timed to occur substantially simultaneously with the low frequency pulse signal from said amplifier.

2. A control system according to claim 1 in which said amplifier comprises a transistor having a base-emitter input circuit and an emitter-collector output circuit and said transistor is rendered conductive by synchronizing and equalizing pulses of the television synchronizing signal of said second signal generator, said control system comprising, in addition, a rectifier connected to said amplifier to transmit only the second part of each cycle of each of said oscillations.

3. A control system according to claim 2 comprising a slipping pulse multivibrator connected to said output circuit of said transistor to be energized by pulses of a predetermined polarity therefrom and to generate a substantially rectangular pulse having a duration approximately equal to 3H where H is the duration of a horizontal line interval of the signal produced by said first signal generator, said rectangular pulse comprising the signal produced by said amplifier.

4. A control system according to claim 1 comprising, in addition, a blocking oscillator connected to said second generator to produce short pulses timed according to the horizontal synchronizing signal repetition rate of said second generator; a sawtooth generator connected to said first signal generator to be controlled thereby to produce a sawtooth wave having a repetition rate equal to the repetition rate of horizontal synchronizing signals of said first signal generator; a clamping circuit connected to said blocking oscillator to be rendered intermittently conductive thereby and connected to said sawtooth generator; a filter connected to said clamping circuit to receive a direct current signal corresponding in a magnitude to the instantaneous amplitude of said sawtooth signal during conductive periods of said blocking oscillator; an oscillator producing said relatively high frequency signal; and means connected from said filter to said oscillator to control the frequency of oscillations in accordance with the direct current amplitude from said filter.

References Cited by the Examiner

UNITED STATES PATENTS

| | | | |
|---|---|---|---|
| 2,713,086 | 7/1955 | Urtel | 178—69.5 |
| 3,045,062 | 7/1962 | Heffron et al. | 178—69.5 |
| 3,047,658 | 7/1962 | March | 178—69.5 |

DAVID G. REDINBAUGH, *Primary Examiner.*

J. O'BRIEN, JOHN McHUGH, *Assistant Examiners.*